United States Patent [19]
Hirano

[11] Patent Number: 5,722,319
[45] Date of Patent: Mar. 3, 1998

[54] EMBOSSED PATTERN STAMPING APPARATUS

[75] Inventor: Toru Hirano, Tokyo, Japan

[73] Assignee: Atena Corporation, Tokyo, Japan

[21] Appl. No.: 675,721

[22] Filed: Jul. 2, 1996

[30] Foreign Application Priority Data

Jul. 7, 1995 [JP] Japan ........................... 7-172610

[51] Int. Cl.$^6$ ........................................ B31F 1/07
[52] U.S. Cl. ................................. 101/23; 101/28
[58] Field of Search ........................ 101/3.1, 22, 23, 101/28

[56] References Cited

U.S. PATENT DOCUMENTS

| 4,732,082 | 3/1988 | Ireton | 101/23 |
| 5,181,464 | 1/1993 | Kuhlman et al. | 101/3.1 |

FOREIGN PATENT DOCUMENTS

| 732869 | 4/1966 | Canada | 101/3.1 |
| 653642 | 3/1929 | France | 101/23 |
| 6-79814 | 3/1994 | Japan | |
| 6-305294 | 11/1994 | Japan | |

*Primary Examiner*—Edgar S. Burr
*Assistant Examiner*—Daniel J. Colilla
*Attorney, Agent, or Firm*—Oblon, Spivak, McClelland, Maier & Neustadt, P.C.

[57] ABSTRACT

The present invention is directed to an apparatus which is suited for use by women, children and the like who have limited physical strength to continuously stamp embossed patterns with clear outlines with the same spacing. A press roller is provided with an embossed pattern stamping die on a circular external circumferential surface, with its rotating shaft supported by bearings at a specific position, and is caused to perform axial rotation by a rotating drive force applied from the outside. A receptacle portion faces opposite the external circumferential surface of the press roller, with its opposing surface constituted as a flat surface or a convex surface to form a gap between itself and the press roller where a sheet-like object to be stamped is to be inserted.

17 Claims, 17 Drawing Sheets

EMBOSSED PATTERN STAMPING APPARATUS

BACKGROUND OF THE INVENTION

1. Field of the Invention

The present invention relates to an apparatus for stamping an embossed pattern, i.e. relief embossing, on a sheet-like object to be stamped.

2. Discussion of Background

Embossed pattern stamping apparatuses of this type are disclosed in Japanese Unexamined Patent Publication (KOKAI) No. 305294/1994, Japanese Unexamined Patent Publication (KOKAI) No. 79814/1994 and the like. In the embossed pattern stamping apparatuses disclosed in these publications, a sheet-like object to be stamped, such as a sheet of paper, is inserted between a female stamping die and a male stamping die and a pressing force is applied between the female stamping die and the male stamping die, so that the stamps provided on both dies are transferred on to the sheet-like object to be stamped. The pressing force for stamping is obtained by operating a lever provided either at the male stamping die or the female stamping die.

With the embossed pattern stamping in the prior art, only one embossed pattern can be obtained with one stamping operation. When stamping a plurality of embossed patterns on one sheet-like object to be stamped, it is necessary to repeat the operation in which the position of the sheet-like object to be stamped relative to the female stamping die and the male stamping die is set manually before the pressing force for stamping is applied. Thus, this method is not suited for continuously stamping a number of embossed patterns with the same spacing.

Furthermore, since the pressing force for stamping is obtained through operating a lever, it is necessary to apply a great deal of force to the lever and, therefore, it is difficult for women, children and the like having limited physical strength, to stamp clear embossed patterns. This problem becomes more pronounced as the area of the embossed patterns increases.

SUMMARY OF THE INVENTION

It is an object of the present invention to provide an embossed pattern stamping apparatus that is suited for continuously stamping a number of embossed patterns having the same spacing.

It is a further object of the present invention to provide an embossed pattern stamping apparatus with which women, children and the like having limited physical strength, can easily stamp embossed patterns with clear outlines.

It is a still further object of the present invention to provide an embossed pattern stamping apparatus with which embossed patterns with clear outlines can be stamped regardless of the size of the area of the embossed patterns.

In order to achieve the objects described above, the embossed pattern stamping apparatus according to the present invention, which is used for stamping embossed patterns on a sheet-like object to be stamped, comprises a press roller and a receptacle portion. The press roller is provided with an embossed pattern stamping die or a mounting portion for mounting an embossed pattern stamping die on a circular external circumferential surface. The rotating shaft of the press roller is supported by bearings at a specific position and is caused to perform axial rotation by a rotating drive force applied from outside. The receptacle portion faces opposite the external circumferential surface of the press roller with its surface which faces opposite the external circumferential surface being a flat surface, a convex surface or a concave surface with a greater radius than the radius of the press roller, to form a gap between itself and the external circumferential surface, where the sheet-like object to be stamped may be inserted.

As described above, since the receptacle portion faces opposite the external circumferential surface of the press roller with a gap formed between the surface which faces opposite the external circumferential surface and the press roller where the sheet-like object to be stamped may be inserted, the sheet-like object to be stamped is inserted between the press roller and the surface of the receptacle portion.

Since the press roller has a circular external circumferential surface and the opposite surface of the receptacle portion constitutes a flat surface, a convex surface or a concave surface with a radius larger than the radius of the press roller, it is possible to apply linear rolling pressure at the external circumferential surface of the press roller along the direction of the axis, to the sheet-like object to be stamped being inserted between the receptacle portion and the press roller. This linear rolling pressure is almost constant, regardless of the size of the area of the embossed patterns. Thus, embossed patterns with clear outlines can be stamped regardless of the area of the embossed patterns.

Since the rotating shaft of the press roller is supported by bearings at a specific position so that it is caused to perform axial rotation by a rotating drive force applied from outside, it is possible to cause the press roller to perform axial rotation and feed the sheet-like object to be stamped while a linear rolling pressure along the direction of the axis is applied at the external circumferential surface of the press roller. This means that a stamping operation can be performed simply by imparting axial rotation to the press roller. Thus, unlike the prior art technology, which applies a pressing load with a lever, the force required for stamping is greatly reduced and even women, children and the like having limited physical strength can easily stamp embossed patterns with clear outlines.

The press roller is provided with an embossed pattern stamping die or a mounting portion for mounting an embossed pattern stamping die on its circular external circumferential surface and, consequently, a plurality of embossed patterns can be continuously stamped with the same spacing on a sheet-like object to be stamped with embossed pattern stamping dies.

The embossed pattern stamping apparatus according to the present invention can be applied to the so-called leaf deposition technology for adding metal leaf patterns to sheets of paper or other sheet-like objects to be stamped as well as when creating embossed patterns on sheets of paper with raised and depressed surface areas on the sheets of paper itself.

BRIEF DESCRIPTION OF THE DRAWINGS

A more complete appreciation of the invention and many of the attendant advantages thereof become better understood when refering to the following detailed description of the accompanied drawings, wherein.

DETAILED DESCRIPTION OF THE PREFERRED EMBODIMENTS

Figure 1:
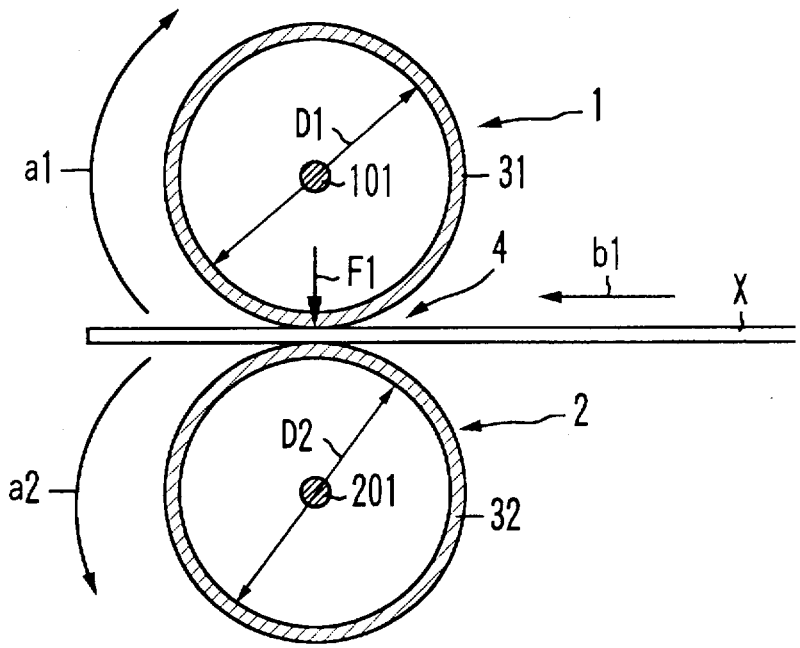
FIG. 1 shows the schematic structure of the embossed pattern stamping apparatus according to the present invention.
Figure 2:
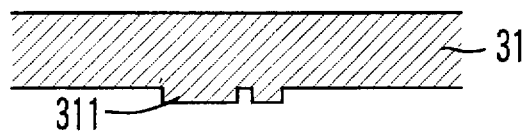
FIG. 2 is a cross section of the embossed pattern stamping die used in the embossed pattern stamping apparatus according to the present invention.

The embossed pattern stamping apparatus shown in FIG. 1 is used for stamping embossed patterns on a sheet-like object (X) and comprises a press roller 1 and a receptacle portion 2. The press roller 1 is provided with an embossed pattern stamping die 31 on a circular external circumferential surface. The embossed pattern stamping die 31 may be directly formed on the external circumferential surface of the press roller 1 or a mounting portion for mounting the embossed pattern stamping die 31 may be provided on the external circumferential surface of the press roller 1, so that the embossed pattern stamping die 31, provided as a separate member from the press roller 1 can be mounted on this mounting portion. FIG. 2 shows the cross section of the embossed pattern stamping die 31 provided as a separate member, with an embossed pattern 311 provided on its surface. The embossed pattern 311 is formed in correspondence to the pattern which is to be obtained. The embossed pattern stamping die 31 may be formed using any material, such as plastic, metal or the like. Referring back to FIG. 1 a rotating shaft 101 of the press roller 1 is supported at a specific position on bearings and is caused to perform axial rotation as indicated with the arrow al by a rotating drive force applied from outside.

The receptacle portion 2 faces opposite the external circumferential surface of the press roller 1 with its surface that faces opposite the external circumferential surface constituted as a flat surface or a convex surface, and a gap 4 for inserting the sheet-like object (X) is formed between the opposing surface and the press roller 1.

As described above, since the receptacle portion 2 faces opposite the circumferential surface of the press roller 1 with a gap for inserting the sheet-like object (X) formed between the opposing surface and the external circumferential surface of the press roller 1, the sheet-like object (X) can be inserted between the external circumferential surface of the press roller 1 and the opposing surface of the receptacle portion 2.

Since the press roller 1 has a circular external circumferential surface and the opposing surface of the receptacle portion 2 is constituted as a flat surface or a convex surface, a linear rolling pressure F1 along the direction of the axis can be applied to the sheet-like object (X) at the external circumferential surface of the press roller 1 between the opposing surface of the receptacle portion 2 and the external circumferential surface of the press roller 1. This linear rolling pressure F1 is almost constant, regardless of the size of the area of the embossed pattern 311 (see FIG. 2). Because of this, an embossed pattern with clear outlines can be stamped on the sheet-like object (X), regardless of the size of the area of the embossed pattern 311.

Since the rotating shaft 101 of the press roller 1 is supported at a specific position by bearings and the press roller 1 is caused to perform axial rotation by a rotating drive force applied from outside, it is possible to cause the press roller 1 to perform axial rotation in the direction indicated with the arrow al and feed the sheet-like object (X) while the linear rolling pressure F1 along the direction of the axis is applied to the sheet-like object (X) at the external circumferential surface of the press roller 1. This means that a stamping operation can be performed simply by imparting axial rotation to the press roller 1. Thus, unlike the prior art technology, which applies a pressing load with a lever, the force required for stamping is greatly reduced so that women, children and the like having limited physical strength can easily stamp embossed patterns with clear outlines.

Since the press roller 1 is provided with an embossed pattern stamping die 31 or a mounting portion for mounting the embossed pattern stamping die 31 on its circular circumferential surface, a plurality of embossed patterns 311 can be continuously stamped on the sheet-like object (X) with the same spacing, by the embossed pattern stamping die 31 provided at the external circumferential surface of the press roller 1. The number, spacing and the like of the embossed patterns 311 are determined in correspondence to the rotation rate of the press roller 1 and the number of embossed patterns 311 in one rotation.

Figure 3:
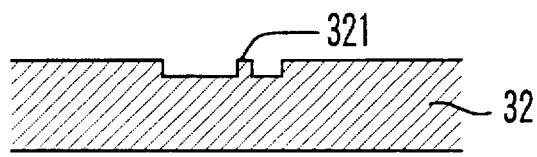
FIG. 3 is a cross section of another embossed pattern stamping die used in the embossed pattern stamping apparatus according to the present invention.

In the embodiment of the present invention shown in FIG. 1, the receptacle portion 2 is constituted with a rotating roller. The receptacle portion 2 constituted with the rotating roller, rotates in the direction indicated with the arrow a2 in conformance to the rotation of the press roller 1. As a result, the object (X) can be smoothly fed through in the direction indicated with the arrow b1. The rotating roller constituting the receptacle portion 2 is provided with an embossed pattern stamping die 32 which forms a pair with the embossed pattern stamping die 31 provided at the press roller 1, on its external circumferential surface. When the embossed pattern stamping die 31 is a male, the embossed pattern stamping die 32 should be a female die. FIG. 3 shows an example of such an embossed pattern stamping die In the case of the embodiment according to the present invention shown in FIG. 1, the diameter D2 of the rotating roller constituting the receptacle portion 2 must be equal to the diameter D1 of the press roller 1. Thus, the embossed pattern stamping die 31 and the embossed pattern stamping die 32 are reliably aligned at a specific die position. In addition, in this structure, a rotation synchronizing mechanism is provided to synchronize the rotation of the rotating roller constituting the receptacle portion 2 with the rotation of the press roller 1. By providing such a synchronizing mechanism, the embossed pattern stamping die 32 can be reliably aligned to the embossed pattern stamping die 31 at a specific die position.

Figure 4:
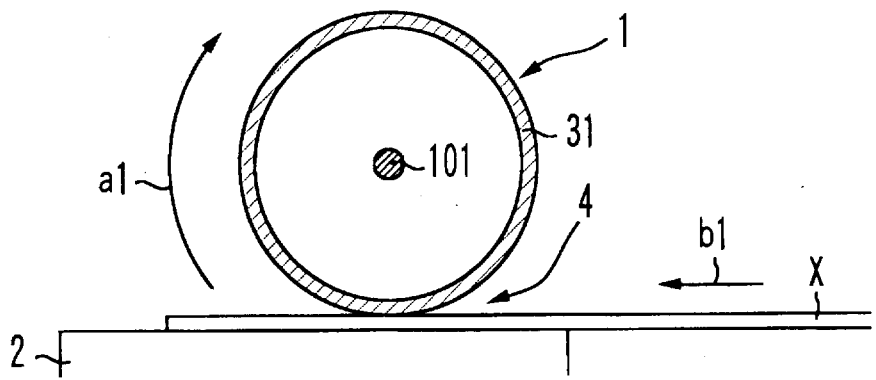
FIG. 4 shows another example of the embossed pattern stamping apparatus according to the present invention.
Figure 5:
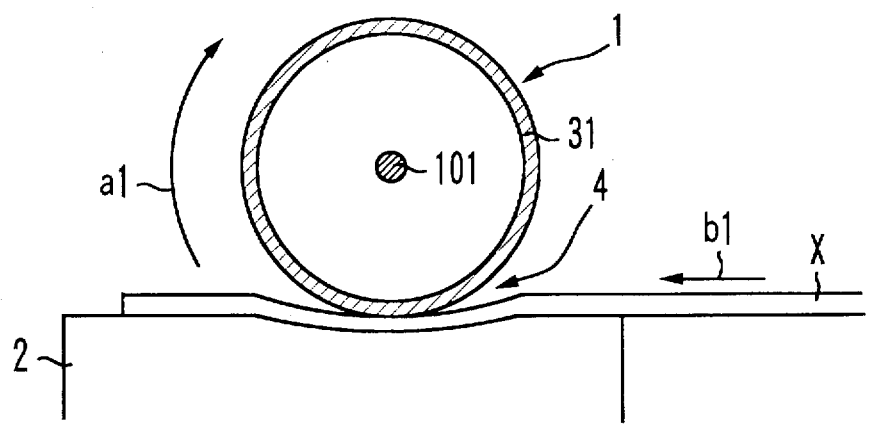
FIG. 5 shows yet another example of the embossed pattern stamping apparatus according to the present invention.
Figure 6:
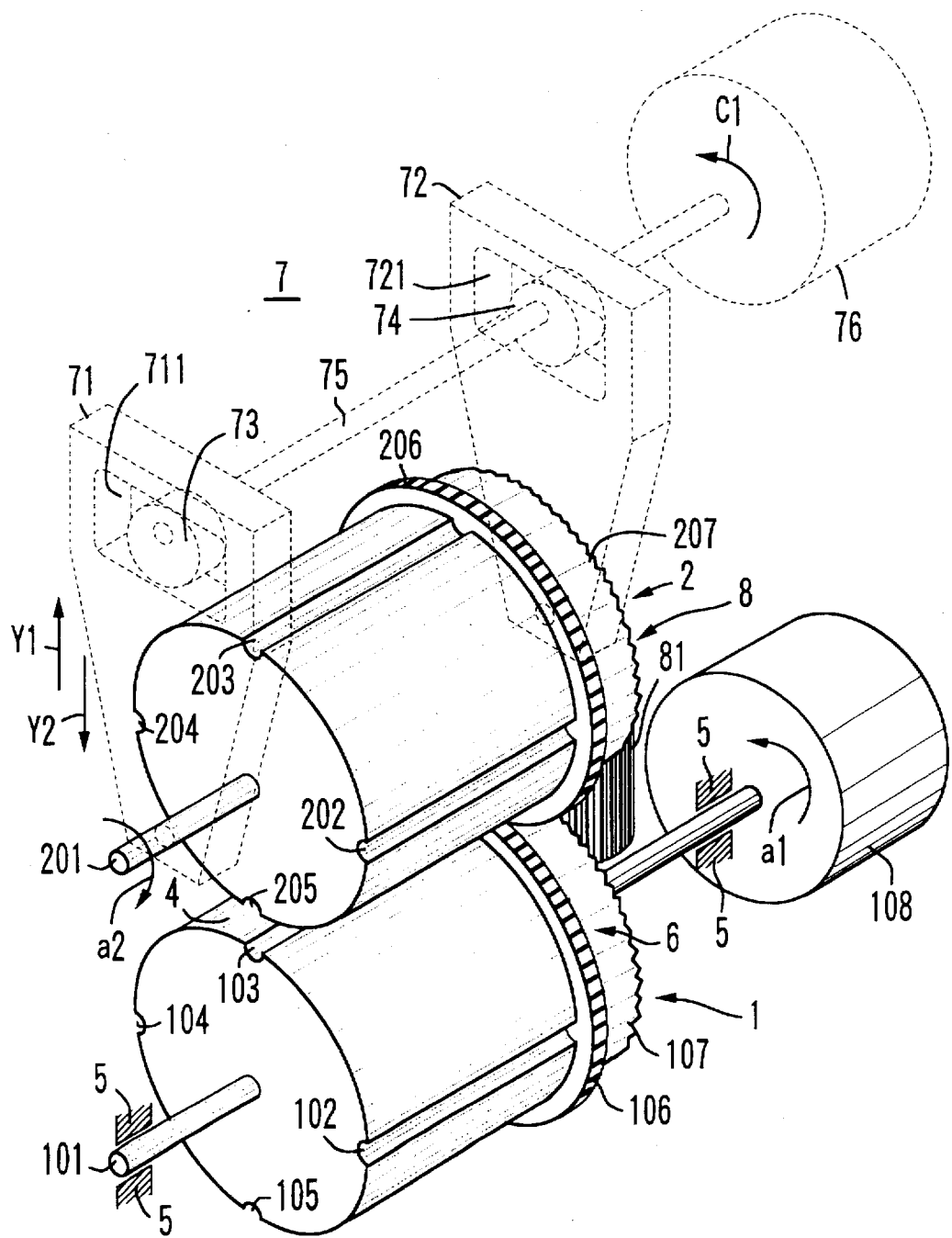
FIG. 6 is a perspective clearly illustrating the internal structure of a specific embodiment of the embossed pattern stamping apparatus according to the present invention.
Figure 7:
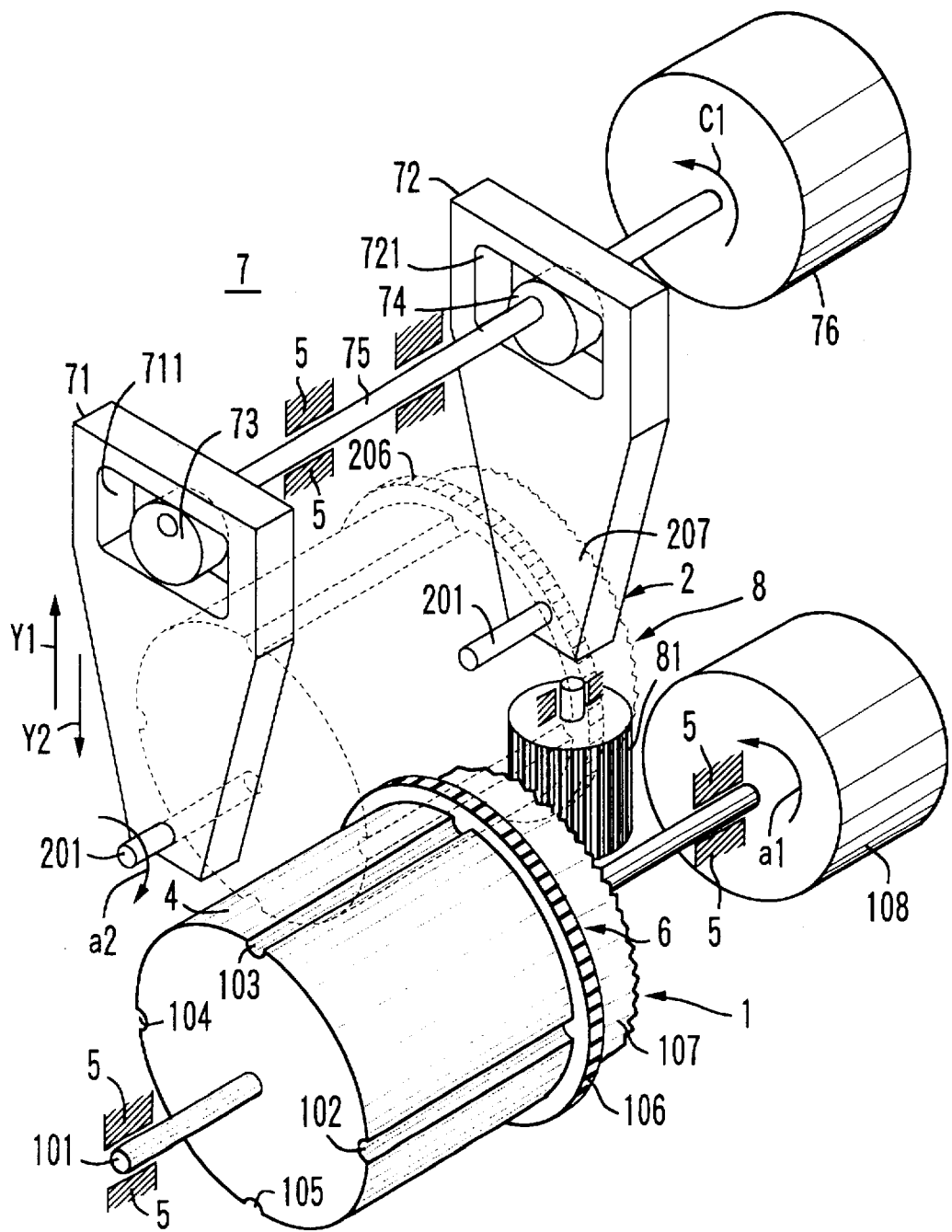
FIG. 7 is another perspective of the embossed pattern stamping apparatus shown in FIG. 6.
Figure 8:
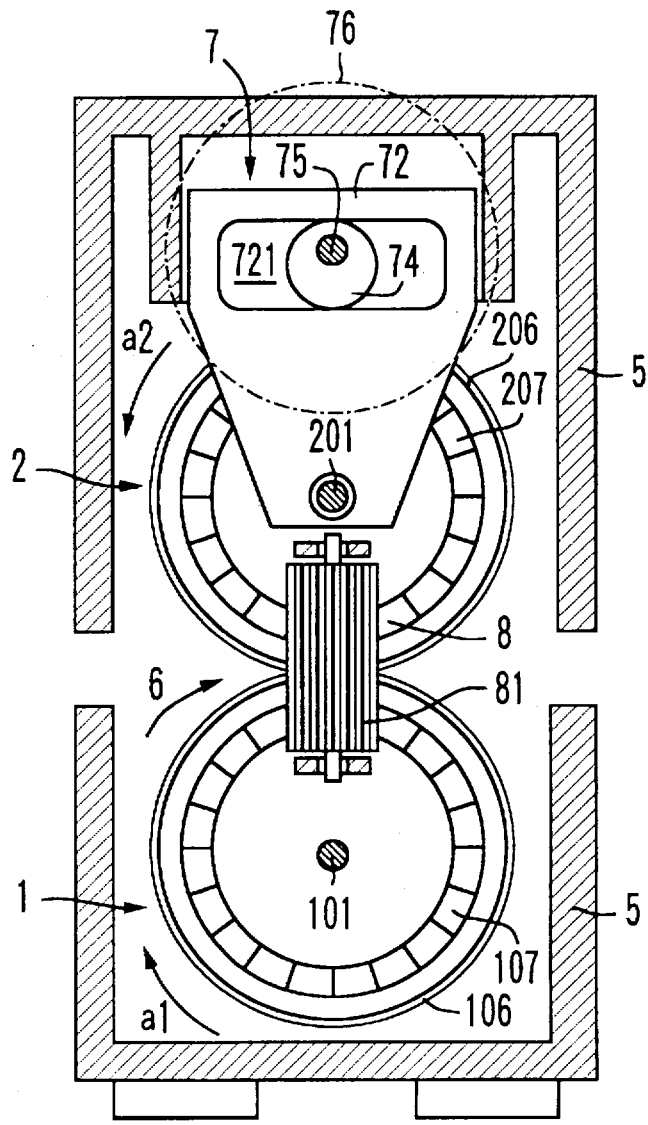
FIG. 8 is a right side cross section of the embossed pattern stamping apparatus shown in FIGS. 6 and 7.
Figure 9:
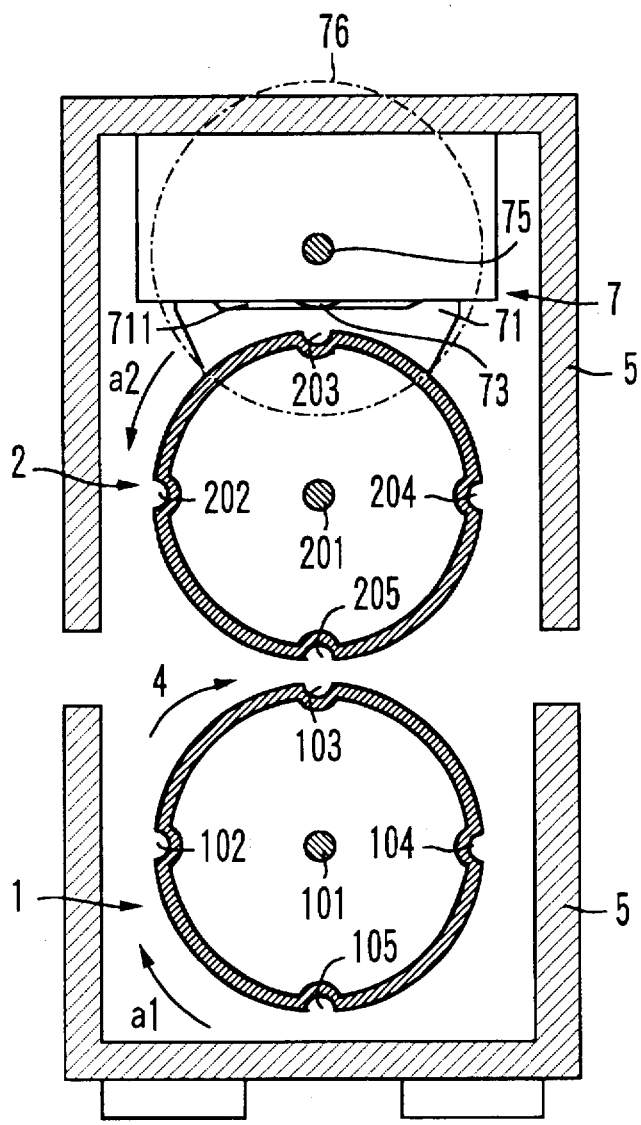
FIG. 9 is a right side cross section viewed at a position further toward the inside than the position in FIG. 6.

While the receptacle portion 2 is constituted with a rotating roller in the structure shown in FIG. 1, the surface of the receptacle portion 2 may be flat as shown in FIG. 4 Alternatively, as shown in FIG. 5, the opposing surface may be constituted with a concave surface having a larger radius than the radius of the press roller 1.

A more specific embodiment according to the present invention is now explained referring to FIGS. 6 to 9.

In these figures, the press roller 1 is provided with mounting portions 102 to 105 for mounting an embossed pattern stamping die on its circular circumferential surface. Both ends of the rotating shaft 101 are supported by bearings at a specific position at a casing 5 (see FIGS. 8 and 9). The rotating shaft 101 is provided with a knob 108 at one end so that a rotating drive force can be manually applied from the outside to this knob 108. This, in turn, causes the press roller 1 to rotate axially in the direction indicated with the arrow a1.

The receptacle portion 2 is constituted with a rotating roller. The rotating roller constituting the receptacle portion 2 is provided with mounting portions 202 to 205 for mounting an embossed pattern stamping die 32 on its circular external circumferential surface. Hereafter, in order to simplify the explanation, the receptacle portion 2 will be described as a rotating roller.

The embodiment shown in FIGS. 6 to 9 is provided with a rotation synchronizing mechanism 6. The rotation synchronizing mechanism 6 synchronizes the rotation of the rotating roller 2 with the rotation of the press roller 1. The rotation synchronizing mechanism 6 is constituted by interlocking a gear 106 formed around a portion of the external circumferential surface of the press roller 1 and a gear 206 formed around a portion of the external circumferential surface of the rotating roller 2. With this rotation synchronizing mechanism 6, the rotation of the rotating roller 2 is accurately synchronized with the rotation of the press roller 1, and the embossed pattern stamping die provided at the press roller 1 and the embossed pattern stamping die provided at the rotating roller 2 can be aligned in the area where the embossed patterns are provided, at all times.

In addition, the structure is provided with a control mechanism 7. The control mechanism 7 controls the gap 4 between the press roller 1 and the rotating roller 2 by controlling the position of the shaft 201 of the rotating roller 2. The control mechanism 7 in the figures is provided with arms 71 and 72, decentering cams 73 and 74, a shaft 75 and a knob 76. The arms 71 and 72 are provided at the two sides of the rotating roller 2 in the direction of the axis over a distance to support the rotating shaft 201 of the rotating roller 2 in such a manner that it can rotate. Windows 711 and 721 are provided in the upper portion of the arms 71 and 72.

The decentering cams 73 and 74 are provided inside the windows 711 and 721 respectively and are coupled by the shaft 75. The shaft 75 is supported by the casing 5 (see FIGS. 8 and 9) in such a manner that it can rotate. When the knob 76 is rotated, the arms 71 and 72 are caused to move up and down by the decentering cams 73 and 74, in the directions Y1 and Y2. This causes the size of the gap 4 between the press roller 1 and the rotating roller 2 to change.

The structure is further provided with a misalignment preventing mechanism 8. The misalignment preventing mechanism 8 prevents rotating positional misalignment of the rotating roller 2 relative to the press roller 1. The misalignment preventing mechanism 8 in the embodiments is provided with a ring-like gear 107 formed at one end of the surface of the press roller 1 in the direction of the axis, a ring-like gear 207 formed at one end surface of the rotating roller 2 in the direction of the axis and a gear 81 that interlocks with the two ring-like gears 107 and 207. When the rotating roller 2 is caused to move in the vertical directions Y1 and Y2 by the control mechanism 7, the rotating roller 2 moves in the vertical directions Y1 and Y2 at the same position as the gear 81 and, consequently, misalignment of the rotating roller 2 relative to the roll press roller 1 is prevented.

Now, the method of operating the embossed pattern stamping apparatus shown in FIGS. 6 to 9 is explained. Referring to FIGS. 10 to 14, when the decentering cams 73 and 74 of the control mechanism 7 are at the positions indicated in FIGS. 6 to 9, the sides of the decentering cams 73 and 74 with larger rotating radii are positioned toward the bottom of the windows 711 and 721 provided in the arms 71 and 72. At this position, the arms 71 and 72 are pushed downward and the position of the rotating shaft 201 of the rotating roller 2 is at its lowest position. The gear 106 and the gear 206 provided at the press roller 1 and the rotating roller 2 respectively are interlocked with each other.

Figure 10:
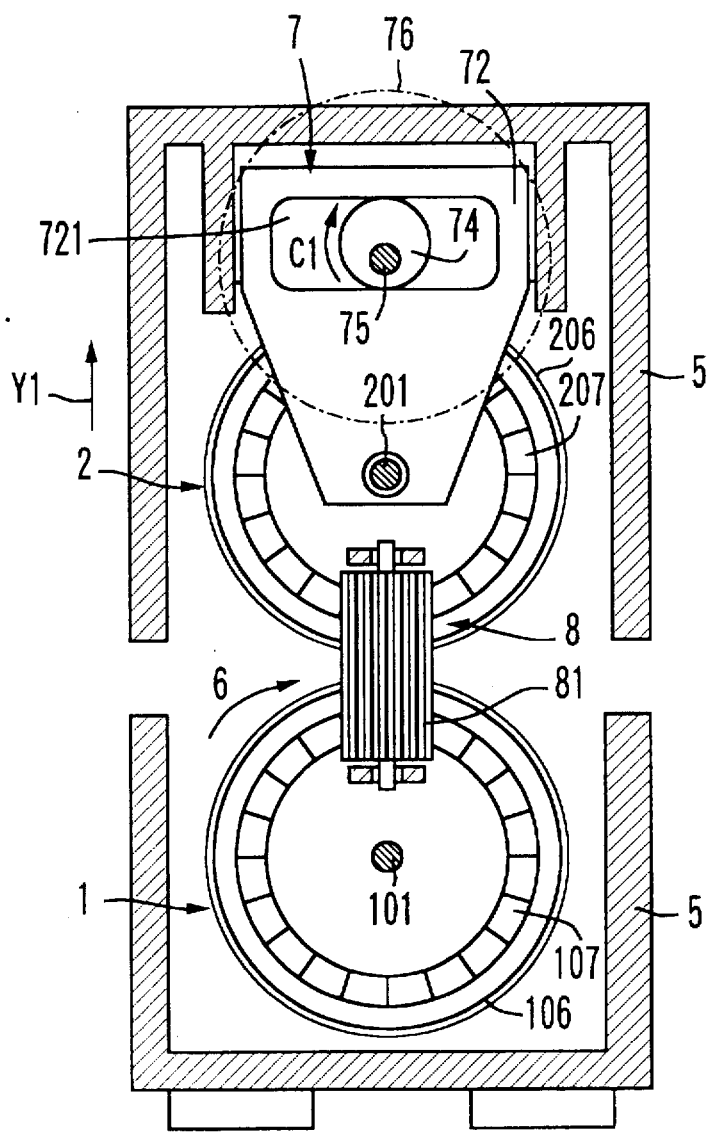
FIG. 10 shows a mode of operation of the embossed pattern stamping apparatus shown in FIGS. 6 to 9.

In the embodiment shown in FIGS. 6 to 9, the knob 76 is rotated in the direction indicated with the arrow C1 (or in the reverse direction) and the rotating shaft 75 is rotated in the same direction, the portions of the decentering cams 73 and 74 with the larger rotating radii move toward the top of the windows 711 and 721 provided in the arms 71 and 72. Since the position of the rotating shaft 75 never changes, the arms 71 and 72 are moved upward and, as a result, the position of the rotating shaft 201 of rotating roller 2 supported by the arms 71 and 72 moves upward by $\Delta Y$ (see FIG. 11). Consequently, as shown in FIGS. 10 and 11, the gap 4 between the press roller 1 and the rotating roller 2 increases.

With the rotating roller 2 having moved upward in the direction Y1, the gear 206 provided at the rotating roller 2 departs from the gear 106 provided at the press roller 1. Since the misalignment preventing mechanism 8 is included, no rotating position misalignment of the rotating roller 2 relative to the press roller 1 occurs. More specifically, when the control mechanism 7 causes the rotating roller 2 to move in the upward direction Y1, the gear provided at the rotating roller 2 moves in the upward direction Y1 at the same position as the gear 81. As a result, misalignment of the rotating roller 2 relative to the press roller 1 is prevented.

Figure 11:
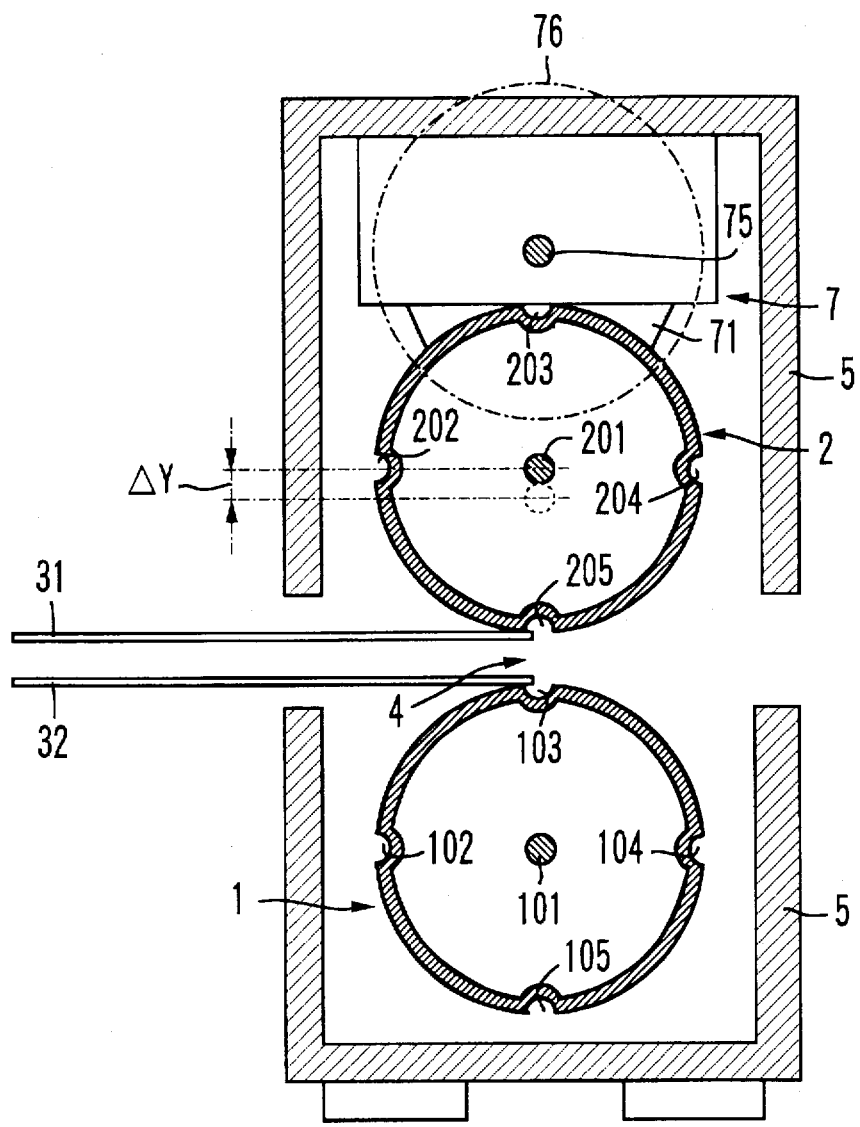
FIG. 11 shows the relationship between the press roller and the rotating roller in correspondence to the operating state shown in FIG. 10.
Figure 12:
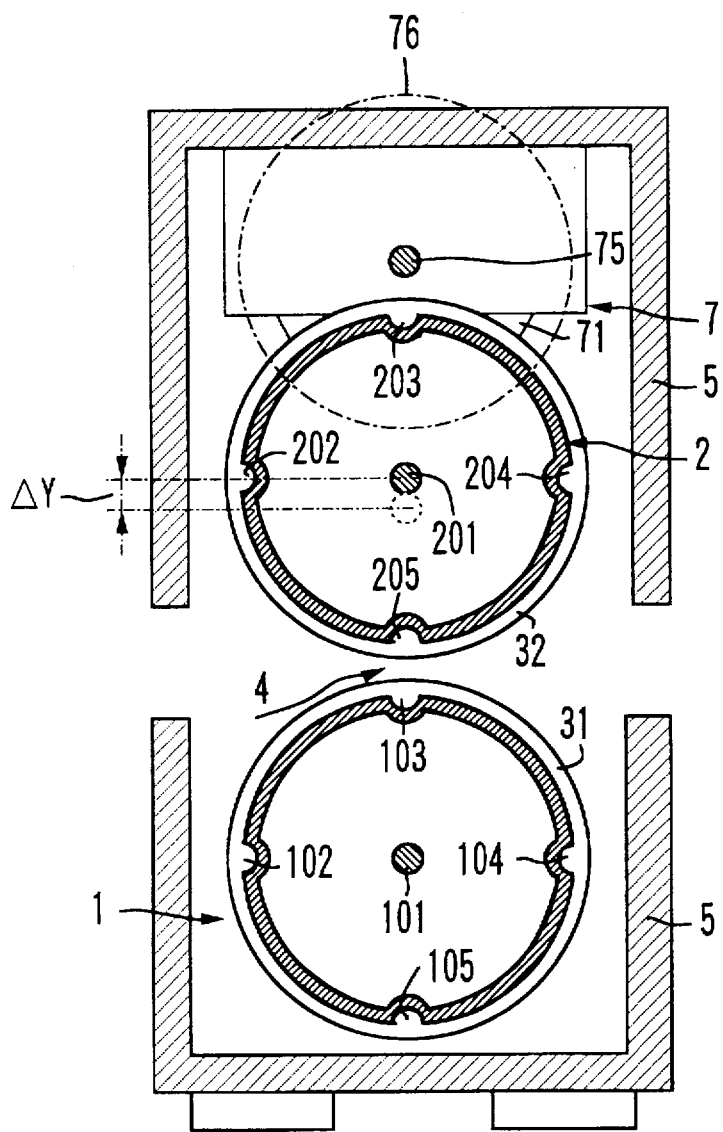
FIG. 12 shows the state which follows the state shown in FIGS. 10 and 11.

Next, as shown in FIG. 11, the embossed pattern stamping die 31 and the embossed pattern stamping die 32 are inserted through the gap 4 which has been increased, as described above, and they are wound around the external circumferential surface of the press roller 1 and the external circumferential surface of the rotating roller 2 respectively. FIG. 12 shows a state in which the embossed pattern stamping die 31 and the embossed pattern stamping die 32 are respectively wound around the external circumferential surface of the press roller 1 and the external circumferential surface of the rotating roller 2.

Figure 13:
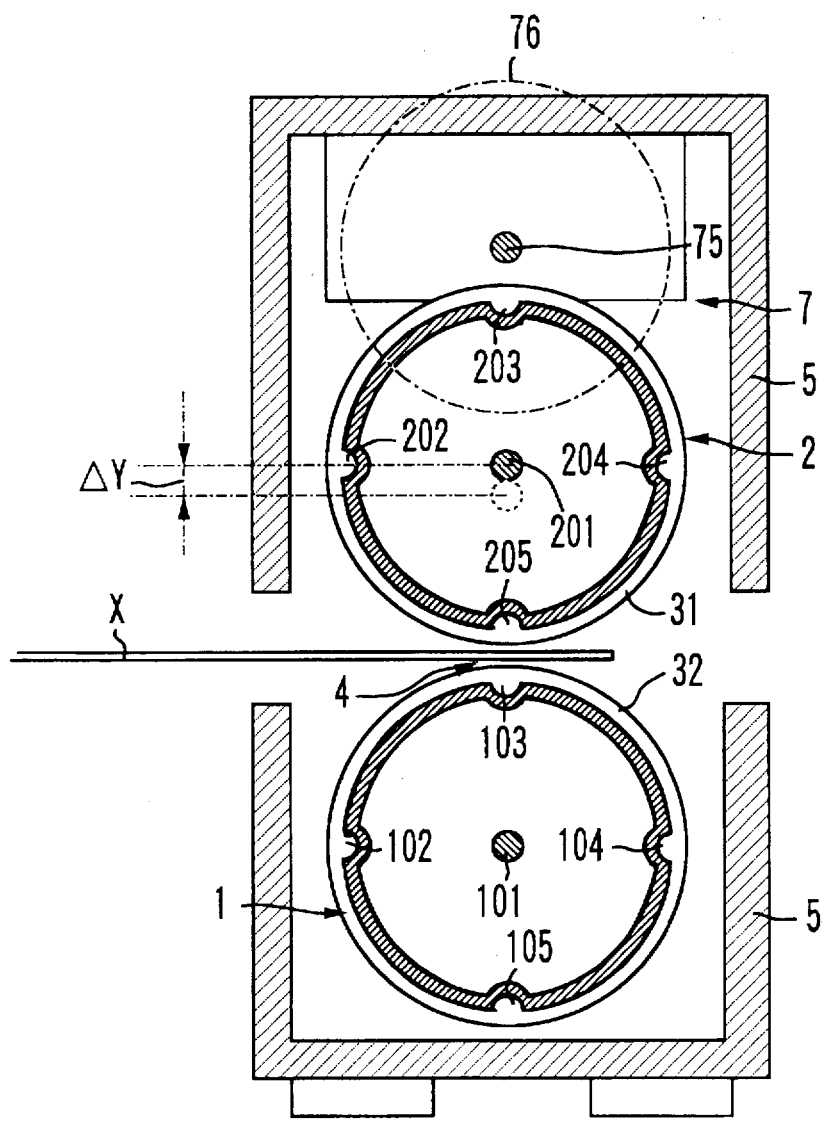
FIG. 13 shows the state which follows the state shown in FIG. 12.

Now, as shown in FIG. 13, the sheet-like object (X) is inserted through the gap 4 formed between the press roller 1 and the rotating roller 2.

Figure 14:
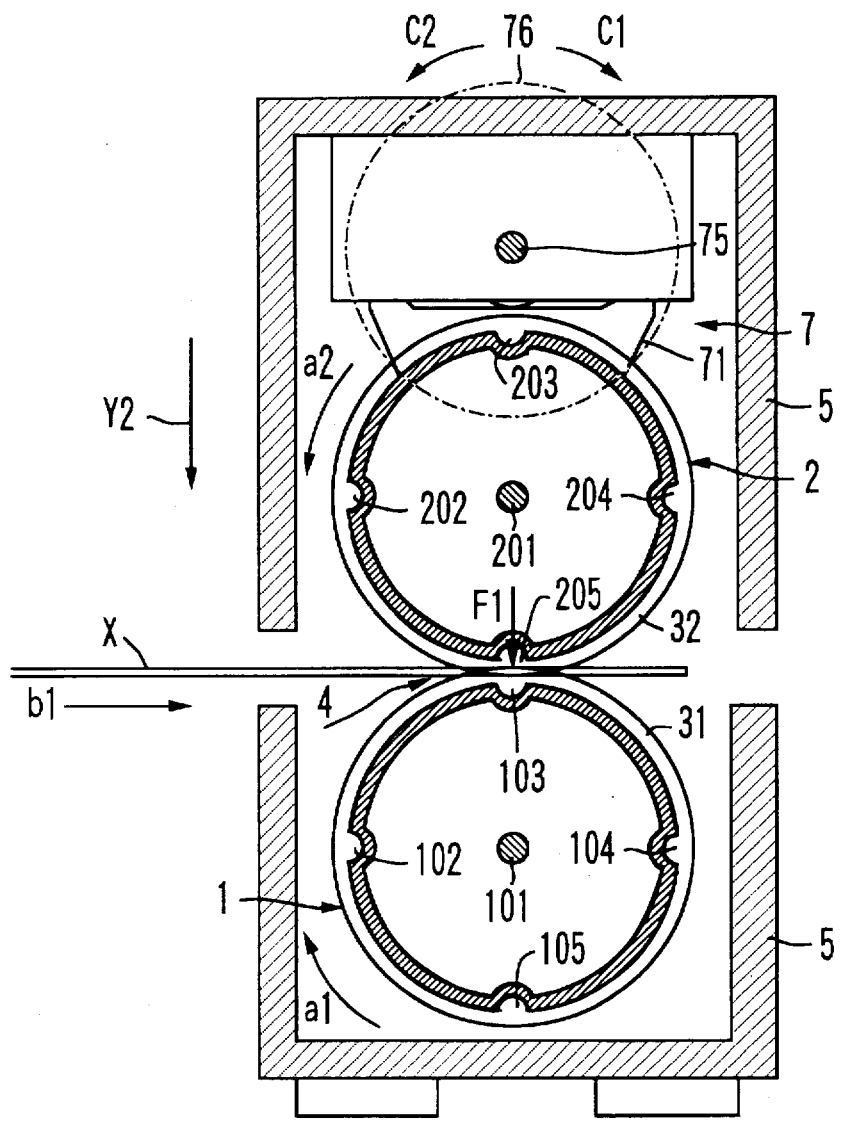
FIG. 14 shows the state which follows the state shown in FIG. 13.

Then, the knob 76 provided at the control mechanism 7 is caused to rotate in the direction indicated with the arrow C1 or in the reverse direction C2 to move the rotating roller 2 in the downward direction Y2 (see FIG. 14). With this, the operation returns to the state shown in FIGS. 6 to 9, and pressure for stamping on the sheet-like object (X) is applied between the press roller 1 and the rotating roller 2. When the rotating roller 2 moves in the downward direction Y2 (see FIG. 14), too, the rotating roller 2 travels in the downward direction Y2 at the same position as the gear 81 and, as a result, rotating position misalignment of the rotating roller 2 relative to the press roller 1 is prevented.

In this state, as seen in FIG. 14, the knob 108 (see FIGS. 6 and 7) provided at the press roller 1 is caused to rotate in the direction indicated with the arrow a1. The rotating roller 2 rotates in the direction indicated with the arrow a2 in conformance with the rotation of the press roller 1. Thus, the embossed patterns on the embossed pattern stamping dies 31 and 32 are stamped on the sheet-like object (X).

At this point, since the press roller 1 has a circular external circumferential surface and the opposing surface of the receptacle portion 2 is constituted as a convex surface, a linear rolling pressure F1 along the direction of the axis of the press roller 1 at the external circumferential surface is applied to the sheet-like object (X) between the opposing surface of the receptacle portion 2 and the external circumferential surface of the press roller 1. This linear rolling pressure F1 is almost constant, regardless of the size of the embossed patterns 311. Thus, embossed patterns with clear outlines can be stamped, regardless of the size of the area of the embossed patterns 311.

Since the rotating shaft 101 of the press roller 1 is supported by bearings at a specific position and the press roller 1 is caused to perform axial rotation by a rotating drive force applied from the outside, the press roller 1 is caused to perform axial rotation in the direction indicated with the arrow a1 and the sheet-like object (X) can be fed while the linear rolling pressure F1 along the direction of the axis is applied to the sheet-like object (X) at the external surface circumferential surface of the press roller 1. This means that the stamping operation can be performed simply by imparting axial rotation to the press roller 1. Thus, unlike the prior art technology, which applies a pressing load with a lever, the force required for stamping is greatly reduced and even women, children and the like with limited physical strength, can easily stamp embossed patterns with clear outlines.

Since the press roller 1 is provided with the embossed pattern stamping die 31 or a mounting portion for mounting the embossed pattern stamping die 31 on its circular external circumferential surface, a great number of embossed patterns can be continuously stamped with the same spacing on the sheet-like object (X), with the embossed pattern stamping die 31 provided at the external circumferential surface of the press roller 1. The number, spacing and like of the embossed patterns are determined in correspondence to the rotation rate of the press roller 1 and the number of embossed patterns in one rotation.

Figure 15:
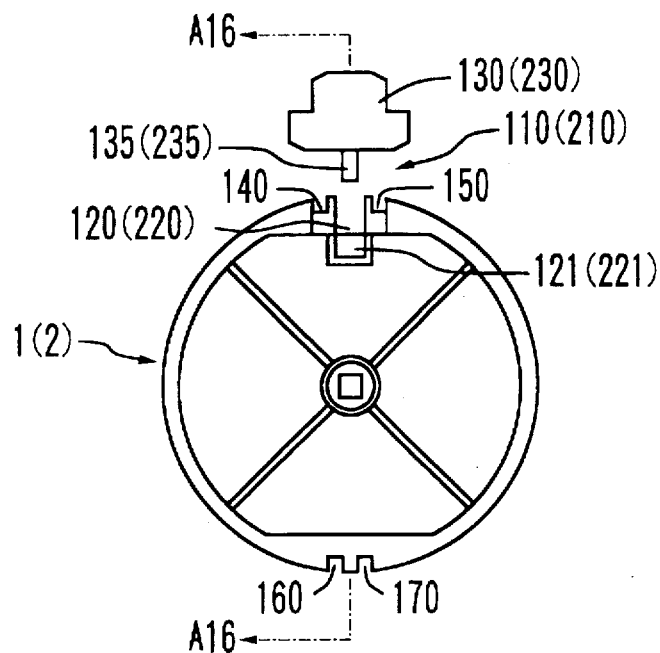
FIG. 15 is an exploded side view of another embodiment of the press roller or the rotating roller according to the present invention.
Figure 16:
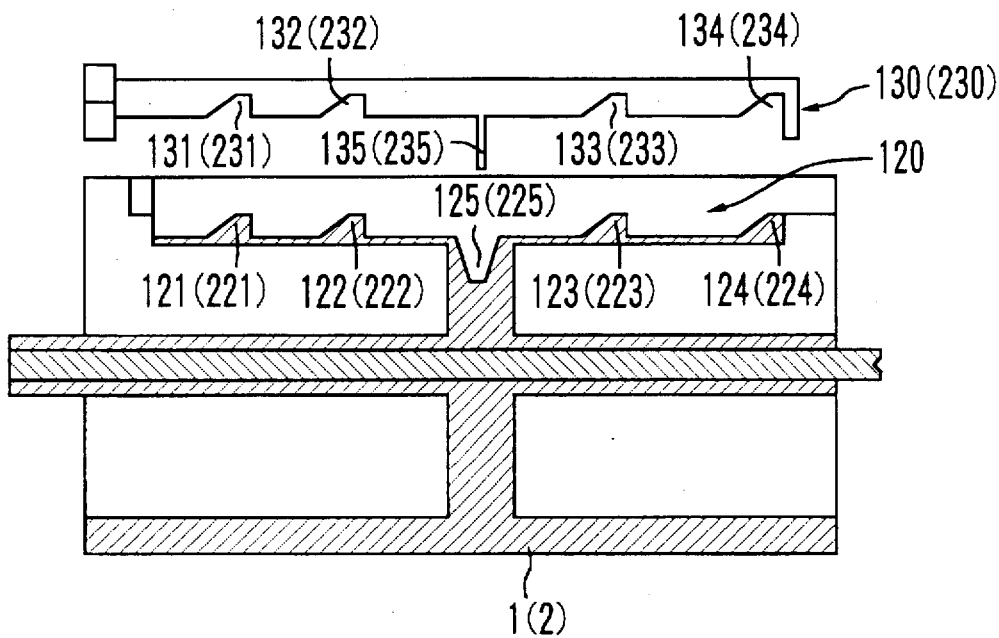
FIG. 16 is a partial cross section through line A16 to A16 in FIG. 15.

FIG. 15 is a side cross section of another embodiment of the press roller 1 or the rotating roller 2 according to the present invention and FIG. 16 is a partial cross section through line A16 to A16 in FIG. 15. In this embodiment, a structure that facilitates removal of the embossed pattern stamping dies mounted on the press roller 1 and the rotating roller 2 is disclosed. The press roller 1 and the rotating roller 2 are provided with mounting portions 110 and 210 respectively for mounting the embossed pattern stamping dies 31 and 32. Since the mounting portion 110 provided at the press roller 1 and the mounting portion 210 provided at the rotating roller 2 have identical structures, only an explanation of the mounting portion 110 provided at the press roller 1 is given below and serves as an explanation of the mounting portion 210 provided at the rotating roller 2.

The mounting portion 110 provided at the press roller 1 includes an indented groove 120 and an operating member 130. The indented groove 120 is provided in the external circumferential surface of the press roller 1 along the axial direction and constitutes an interlocking portion where one end of the embossed pattern die is connected and retained. Projections 121 to 124 are provided over intervals at the bottom portion of the indented groove 120 and between the projection 122 and the projection 123, a relatively deep indented portion 125 is provided.

In addition, indented grooves 140 and 150 are separately provided running parallel to each other at the two sides of the indented groove 120. Furthermore, on the opposite side from where the indented grooves 120, 140 and 150 are positioned, indented grooves 160 and 170, which are almost identical to the indented grooves 140 and 150, are provided running almost parallel to each other.

The operating member 130 provided at the press roller 1 has a form that makes it possible for the operating member 130 to be positioned in the indented groove 120. The operating member 130 is constituted of a material with flexibility and elasticity, such as plastic, for instance, and indented portions 131 to 134, which fit with the projections 121 to 124, are provided at positions facing opposite the projections 121 to 124 of the indented groove 120, with a relatively thin projection 135, which is to be inserted inside the indented portion 125 provided at the press roller 1, between the indented portion 132 and the indented portion 133.

Figure 17:
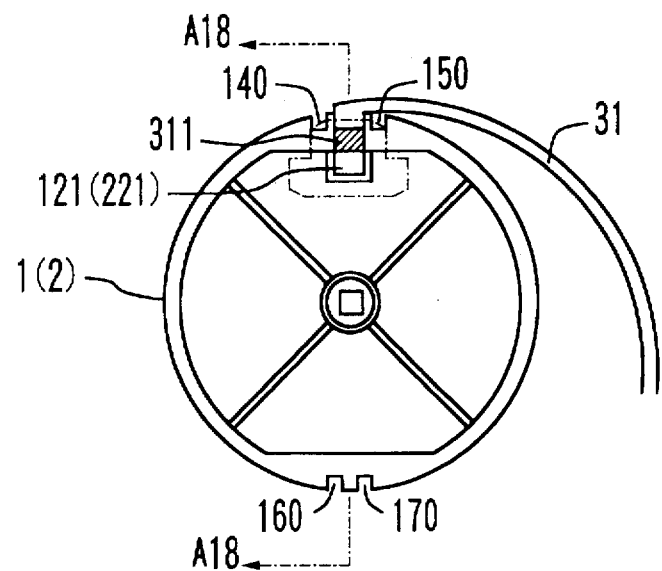
FIG. 17 is a partial cross section showing a state in which the embossed pattern stamping die 31 or 32 is fitted in after an operating member is mounted at the press roller or the rotating roller shown in FIGS. 15 and 16.
Figure 18:
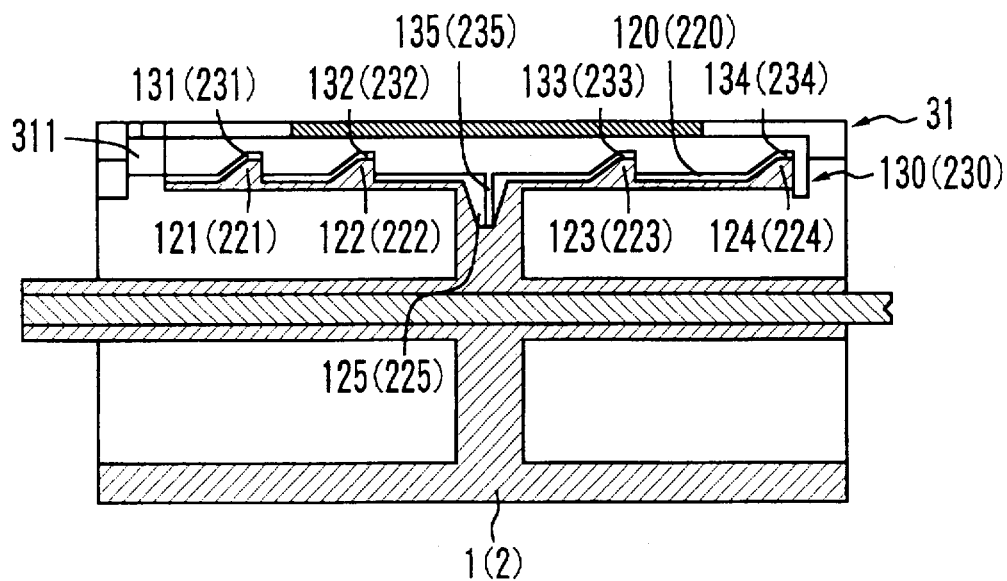
FIG. 18 is a partial cross section through line A18 to A18 in FIG. 17.

FIG. 17 is a partial side cross section showing a state in which the embossed pattern stamping die 31 or 32 is fitted in after the operating member 130 or 230 is mounted at the press roller 1 or the rotating roller 2 shown in FIGS. 15 and 16. FIG. 18 is a partial cross section through line A18 to A18 in FIG. 17.

Referring to FIGS. 17 and 18, the operating member 130 is positioned inside the indented groove 120 in a state in which the indented portions 131 to 134 are fitted with the projections 121 to 124 in the indented groove 120 and the thin projection 135 provided between the indented portion 132 and the indented portion 133 is inserted inside the indented portion 125 provided at the press roller 1. Toward the upper surface of the operating member 130, a space is provided for mounting a linear interlocking piece 311 that is formed at one end of the embossed pattern stamping die 31, and the interlocking piece 311 of the embossed pattern stamping die 31 is fitted inside this space by means such as press fitting.

Figure 19:
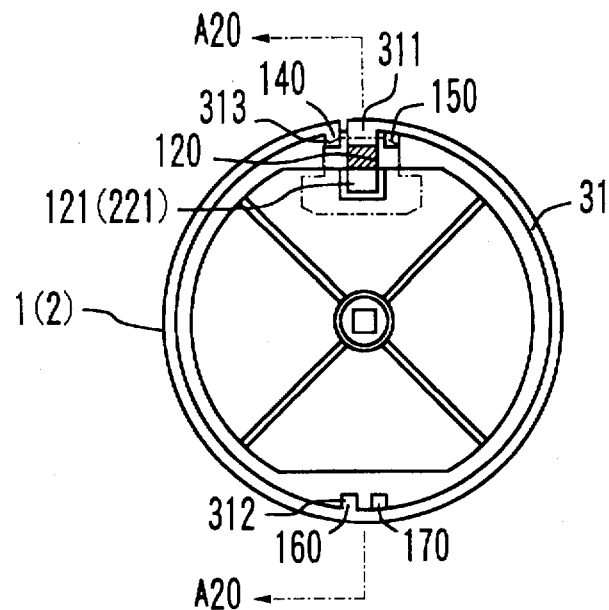
FIG. 19 is an illustration of a state in which an embossed pattern stamping die is fitted in the press roller or the rotating roller shown in FIGS. 15 and 16.
Figure 20:
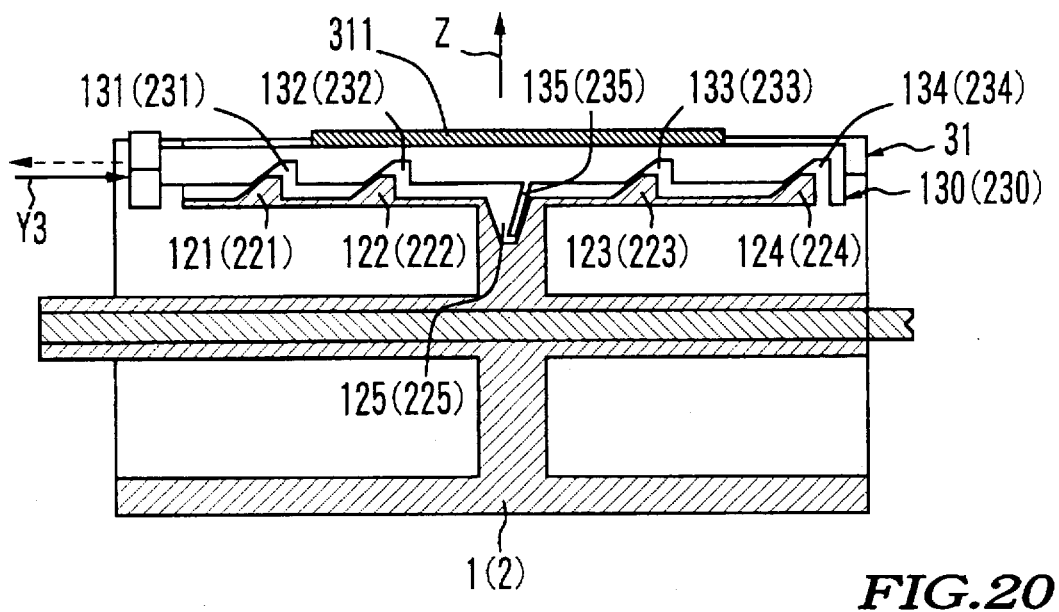
FIG. 20 is a partial cross section through line A20 to A20 in FIG. 19, illustrating the operation to take out the embossed pattern stamping die.

FIG. 19 shows a state in which the embossed pattern stamping die 31 or 32 is fitted in the press roller 1 or the rotating roller 2 shown in FIGS. 15 and 16. FIG. 20 is a partial cross section through line A20 to A20 in FIG. 19, which illustrates the operation with which the embossed pattern stamping die 31 or 32 is removed.

As shown in FIG. 19, the embossed pattern stamping die 31, after the interlocking piece 311 provided at one end is connected and retained at the indented groove 120, is guided along the external circumferential surface of the press roller 1. An interlocking piece 312, provided in the middle portion, is press fitted in the indented groove 160 provided in the press roller 1 and an interlocking piece 313, provided at the opposite end from the interlocking piece 311, is fitted in the indented groove 140 by means such as press fitting. With this, the embossed pattern stamping die 31 is securely mounted to the external circumferential surface of the press roller 1.

In order to remove the embossed pattern stamping die 31 that has been mounted at the external circumferential surface of the press roller 1 as described above, a pressing force must be applied to the operating member 130 in the direction indicated with the arrow Y3 shown in FIG. 20. When a pressing force is applied to the operating member 130 in direction Y3, the end surfaces of the indented portions 131 to 134 slide in the vertical direction Z along the end surfaces of the projections 121 to 124 of the indented groove 120. This causes the interlocking piece 311 of the embossed pattern stamping die 31, which is connected inside the indented groove 120 to be pressed upward in direction Z to be released from the indented groove 120.

At this time, the thin projection 135 provided at the operating member 130 comes in contact with the indented portion 125 and becomes deformed. Thus, when the pressing force in direction Y is removed, the operating piece 130 returns to the initial position due to the recovery force caused by the deformation of the projection 135.

Figure 21:
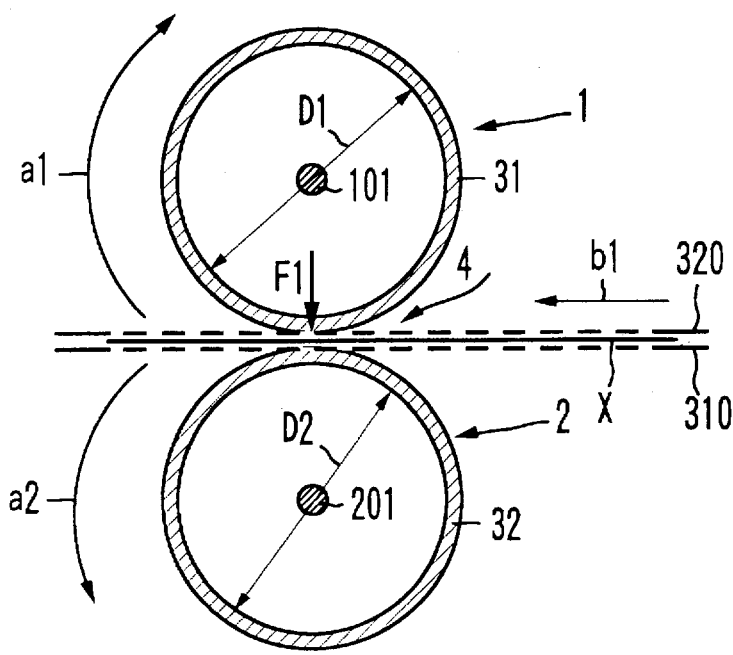
FIG. 21 is yet another embodiment of the embossed pattern stamping apparatus according to the present invention.
Figure 22:
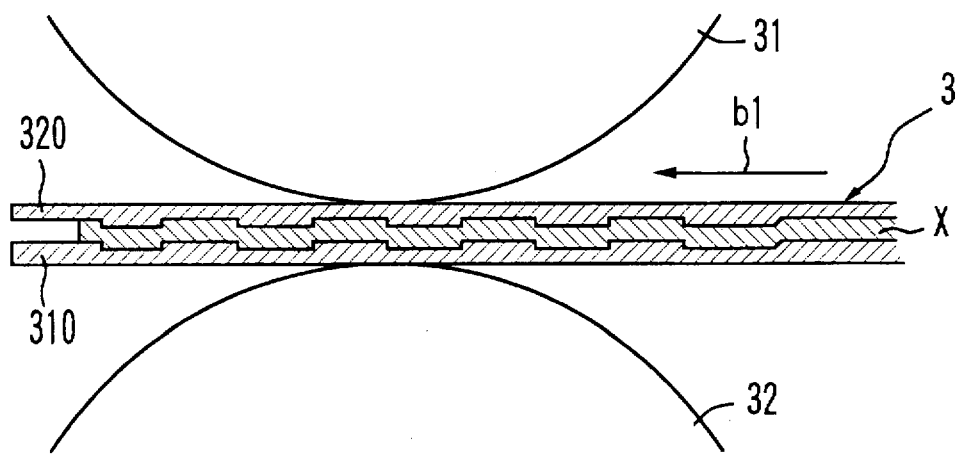
FIG. 22 is an enlarged partial cross section of the embossed pattern stamping apparatus shown in FIG. 21.

FIG. 21 shows yet another embodiment of the embossed pattern stamping apparatus according to the present invention and FIG. 22 is an enlarged partial cross section of the embossed pattern stamping apparatus shown in FIG. 21. The embossed pattern stamping apparatus shown in the figures includes the press roller 1, the rotating roller 2 and an embossed pattern stamping die 3, which is an independent member. The structures of press roller 1 and the rotating roller 2 are identical to those in the embodiment shown in FIGS. 6 to 14 but without the embossed pattern stamping dies.

The embossed pattern stamping die 3 includes an indented die member 310 and a projected die member 320. The indented die member 310 is provided with an indented die pattern and the projected die member 320 is provided with a projected die pattern that fits into the indented die pattern. The indented die member 310 and the projected die member 320 are linked to each other in such a manner that they can be folded over.

During operation, a sheet-like object (X), is sandwiched between the indented die member 310 and the projected die member 320 which are folded over. In this state, they are inserted between the press roller 1 and the rotating roller 2 and the press roller 1 and the rotating roller 2 are caused to rotate in the directions indicated with the arrows a1 and a2. This causes the embossed patterns of the embossed pattern stamping dies 310 and 320 to be stamped onto the sheet-like object (X).

Figure 23:
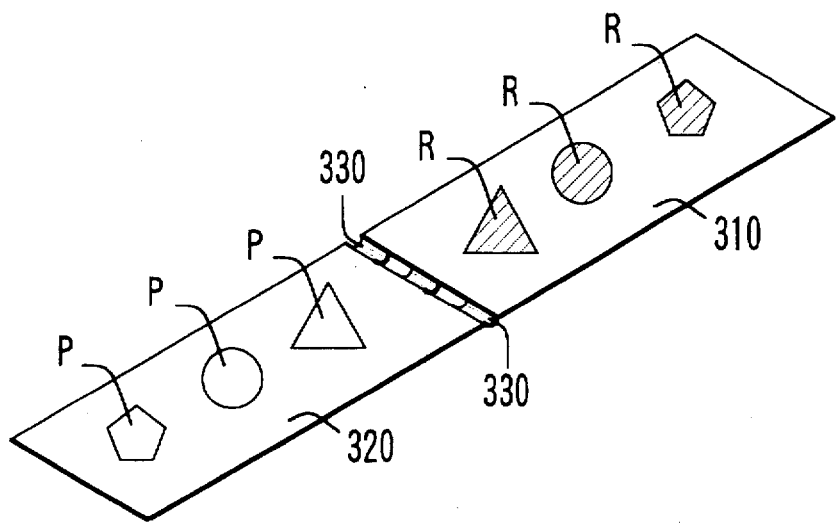
FIG. 23 is a perspective of an embossed pattern stamping die.

FIG. 23 is a perspective of the embossed pattern stamping die. The indented die member 310 is provided with an indented die pattern R and the projected die member 320 is provided with a projected die pattern P that fits into the indented die pattern R. The indented die member 310 and the projected die member 320 are linked to each other in such a manner that they can be folded over. The indented die member 310 and the projected die member 320 are directly linked to each other with a hinge mechanism 330 provided where they are linked for being folded over.

Figure 24:
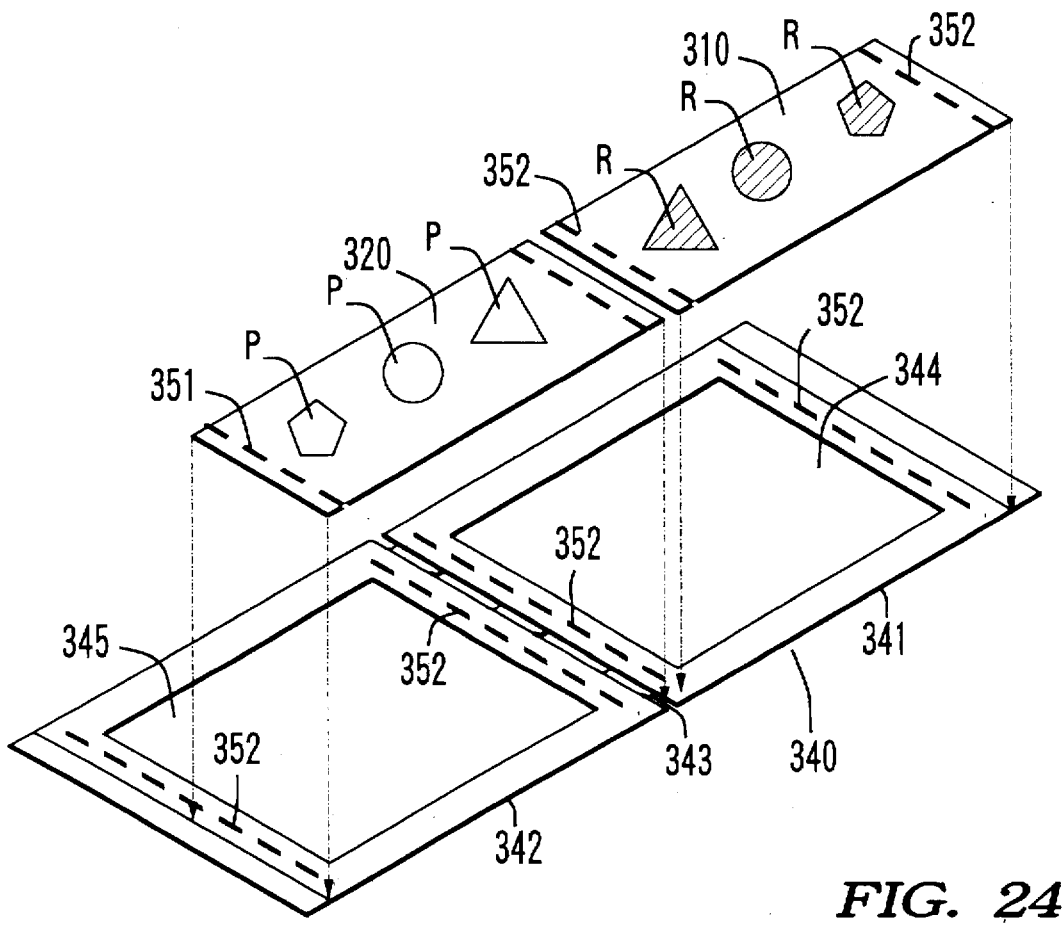
FIG. 24 is an exploded perspective of another embodiment of the embossed pattern stamping die.
Figure 25:
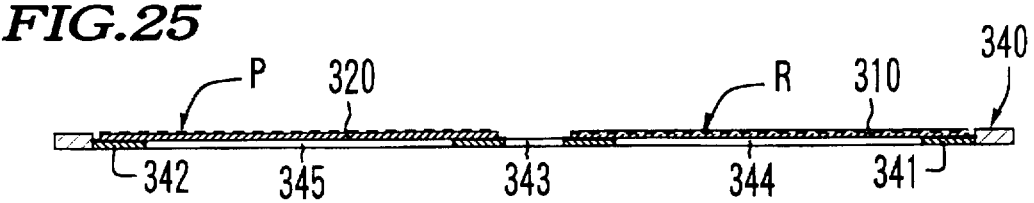
FIG. 25 is a cross section of the embossed pattern stamping die shown in FIG. 24.

FIG. 24 is an exploded perspective of another embodiment of the embossed pattern stamping die and FIG. 25 is a cross section of the embossed pattern stamping die shown in FIG. 24. In this embodiment, the embossed pattern stamping die is provided with a frame member 340. The frame member 340 is provided with a hinge mechanism 343 for being folded over. The frame member 340 is also provided with at least two open portions 344 and 345, which are surrounded by frame portions 341 and 342 at the left and right of the hinge mechanism 343.

The indented die member 310 and the projected die member 320 are positioned facing the open portions 344 and 345 and are connected to the frame portions 341 and 342 at the edges. The indented die member 310 and the projected die member 320 are connected to the frame member 340 by means such as velcro adhering material or indentation/projection connecting means 351 and 352.

Figure 26:
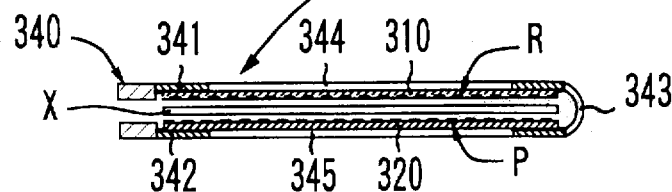
FIG. 26 is an illustration showing a state in which the embossed pattern stamping die shown in FIGS. 24 and 25 is folded.

FIG. 26 shows a state in which the embossed pattern stamping die shown in FIGS. 24 and 25 is folded. The indented die member 310 and the projected die member 320 are mounted on the frame member 340 and the frame portion 341 is placed on top of the frame portion 342 via the sheet-like object (X). Then, in this state, the embossed pattern stamping processing, shown in FIGS. 21 and 22, is performed.

Figure 27:
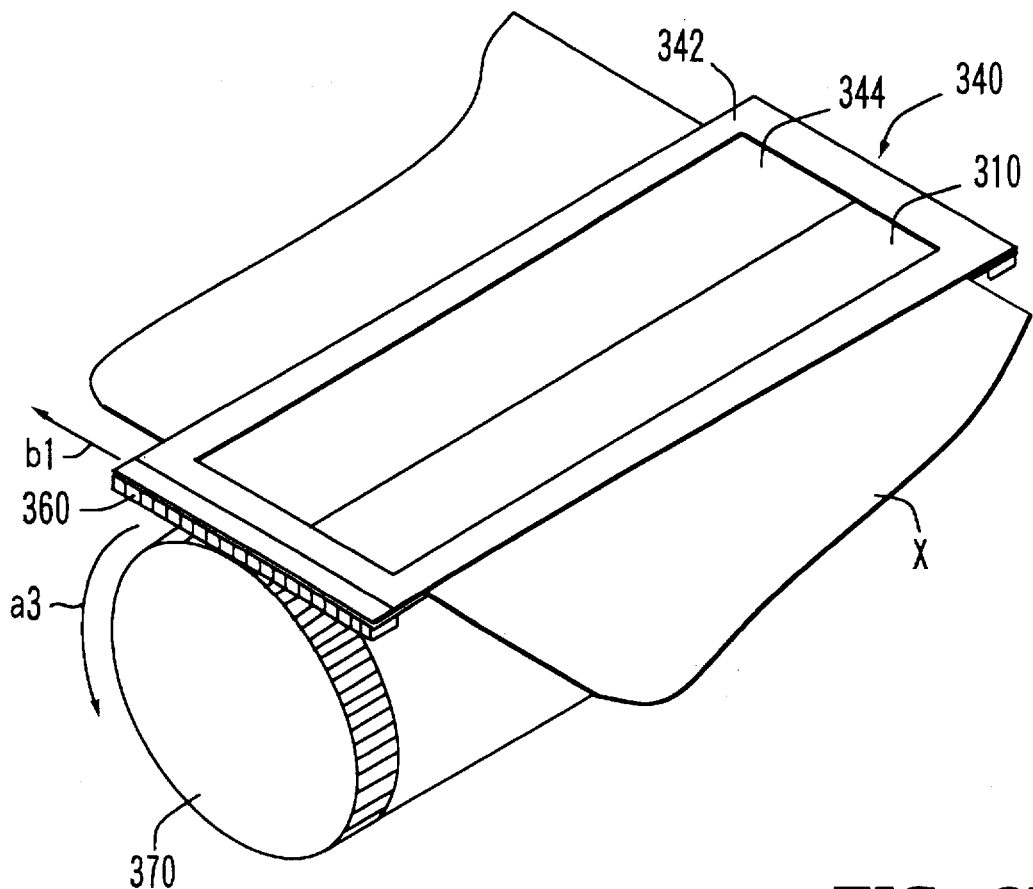
FIG. 27 is a perspective of another embodiment of the embossed pattern stamping die in its operating state.

FIG. 27 is a perspective of another embodiment of the embossed pattern stamping die in the operating state. In the embossed pattern stamping die in the figure, the frame member 340 is provided with a rack gear 360. The rack gear 360 interlocks with a gear 370 which rotates in synchronization with the press roller or the rotating roller. In this embodiment, by causing the gear 370 to rotate in the direction indicated with the arrow a3 in synchronization with the press roller or the rotating roller, the embossed pattern stamping die and the sheet-like object (X) can be reliably fed in the direction indicated with the arrow b1.

Although not illustrated in the figures, the rotation synchronizing mechanism, the control mechanism, the misalignment preventing mechanism and the like, which are illustrated in FIGS. 6 to 10 and explained in reference to them, can be employed in the embodiments shown in FIGS. 21 to 27.

Although the details of the present invention have been explained so far by referring to the preferred embodiment, a number of variations based upon the basic concept, teachings and technological scope of the present invention will be obvious to persons skilled in the field to which the present invention pertains.

What is claimed is:

1. An apparatus for stamping an embossed pattern on a sheet-like object, comprising:

a press roller and a rotating roller, wherein:

said press roller is provided with an embossed pattern stamping die at a circular external circumferential surface, and with a rotating shaft supported by bearings, and is caused to perform axial rotation by a rotating drive force applied from the outside;

said rotating roller faces opposite said external circumferential surface of said press roller to form a gap for said sheet-like object to be inserted between said rotating roller and said press roller;

said press roller and said rotating roller are both provided with mounting portions for mounting an embossed pattern stamping die;

said mounting portions are each provided with an indented groove and an operating member;

said indented groove is provided at said external circumferential surface of one of said press roller and said rotating roller in the direction of the axis thereof to constitute an interlocking portion to which one end of said embossed pattern stamping die is connected and retained; and said operating member is positioned inside said indented groove and is deflected by a force applied from the outside to press said embossed pattern stamping die that is connected and retained inside said indented groove upward so that said embossed pattern stamping die can be taken out of said indented groove.

2. An apparatus according to claim 1 wherein;

said rotating roller is provided with an embossed pattern stamping die on an external circumferential surface, which forms a pair with said embossed pattern stamping die provided on said press roller.

3. An apparatus according to claim 2, further comprising;

a rotation synchronizing mechanism for synchronizing the rotation of said rotating roller with the rotation of said press roller.

4. An apparatus according to claim 3, wherein;

said rotation synchronizing mechanism is constituted by interlocking a gear formed around a portion of said external circumferential surface of said press roller and a gear formed around a portion of said external circumferential surface of said rotating roller.

5. An apparatus according to claim 4, further comprising;

a control mechanism for controlling the position of a rotating shaft of said rotating roller so that the size of said gap between said press roller and said rotating roller is controlled.

6. An apparatus according to claim 5, further comprising;

a misalignment preventing mechanism for preventing positional misalignment of the rotating position of said rotating roller relative to said press roller.

7. An apparatus according to claim 6, wherein;

said misalignment preventing mechanism is provided with a circular gear formed at one end surface of said press roller end surface of said rotating roller in the direction of its shaft and one gear that interlocks with both said circular gears.

8. An apparatus for stamping embossed patterns on a sheet-like object, comprising a press roller, a rotating roller and an embossed pattern stamping die, wherein;

a rotating shaft of said press roller is supported at a bearing to perform axial rotation with a rotating drive force applied from outside;

an external circumferential surface of said rotating roller faces opposite said external circumferential surface of said press roller, with said rotating roller being separated from said press roller by a gap;

said embossed pattern stamping die includes an indented die member and a projected die member, with said indented die member having an indented die pattern and said projected die member having a projected die pattern which fits into said indented die pattern;

said embossed pattern stamping die includes a frame member;

said frame member is provided with a hinge mechanism for folding over and at least two open portions surrounded by frame portions to the left and right of said hinge mechanism; and said indented die member and said projected die member are positioned facing said open portions, being linked to said frame portion at edges thereof.

9. An apparatus according to claim 8, wherein;

said indented die member and said projected die member are linked so that said indented die member and said projected die member can be folded over.

10. An apparatus according to claim 9, wherein;

said indented die member and said projected die member are linked directly with a hinge mechanism provided where said indented die member and said projected die member are linked allowing said projected die member and said indented die member to be folded over.

11. An apparatus according to claim 8, wherein;

said indented die member and said projected die member are linked to said frame member by indentation/projection connecting means.

12. An apparatus according to claim 8, wherein;

said frame member is provided with a rack gear, said rack gear interlocking with a gear that rotates in synchronization with one of said press roller and said rotating roller.

13. An apparatus according to claim 8, further provided with;

a rotation synchronizing mechanism for synchronizing rotation of said rotating roller with rotation of said press roller.

14. An apparatus according to claim 13, wherein;

said rotation synchronizing mechanism is constituted with a combination of a gear formed around a portion of said external circumferential surface of said press roller and a gear formed around a portion of said external circumferential surface of said rotating roller.

15. An apparatus according to claim 14, further provided with;

a control mechanism for controlling said gap between said press roller and said rotating roller by controlling a rotating shaft position of said rotating roller.

16. An apparatus according to claim 15, further provided with;

a misalignment preventing mechanism that prevents rotating position misalignment of said rotating roller relative to said press roller.

17. An apparatus according to claim 16, wherein;

said misalignment preventing mechanism includes a circular gear formed at one end surface in the direction of the axis of said press roller, a circular gear formed at one end surface in the direction of the axis of said rotating roller and a gear that interlocks with said two circular gears.

* * * * *